United States Patent
Sharkh et al.

(10) Patent No.: US 12,449,014 B2
(45) Date of Patent: Oct. 21, 2025

(54) VIBRATION CONTROL SYSTEMS

(71) Applicant: BAE SYSTEMS plc, London (GB)

(72) Inventors: Suleiman Mahmoud Sharkh, Southampton (GB); Stephen Daley, Southampton (GB); Mehdi Hendijanizadeh, Southampton (GB)

(73) Assignee: BAE SYSTEMS PLC, London (GB)

( * ) Notice: Subject to any disclaimer, the term of this patent is extended or adjusted under 35 U.S.C. 154(b) by 224 days.

(21) Appl. No.: 18/257,602

(22) PCT Filed: Dec. 6, 2021

(86) PCT No.: PCT/GB2021/053180
§ 371 (c)(1),
(2) Date: Jun. 15, 2023

(87) PCT Pub. No.: WO2022/129865
PCT Pub. Date: Jun. 23, 2022

(65) Prior Publication Data
US 2024/0035535 A1    Feb. 1, 2024

(30) Foreign Application Priority Data

Dec. 15, 2020  (EP) .................................... 20275179
Dec. 15, 2020  (GB) .................................... 2019754

(51) Int. Cl.
*F16F 7/00*  (2006.01)
*F16F 6/00*  (2006.01)
(Continued)

(52) U.S. Cl.
CPC .............. *F16F 7/1011* (2013.01); *F16F 6/00* (2013.01); *H02K 33/18* (2013.01);
(Continued)

(58) Field of Classification Search
CPC .. F16F 7/10; F16F 7/104; F16F 7/1011; F16F 7/1005; F16F 6/00; F16F 7/108;
(Continued)

(56) References Cited

U.S. PATENT DOCUMENTS

| 2,434,337 A | * | 1/1948 | Soderstrom | ............ H02K 33/12 |
| | | | | 318/129 |
| 3,088,062 A | * | 4/1963 | Hudimac | ................ F16F 15/06 |
| | | | | 318/128 |

(Continued)

FOREIGN PATENT DOCUMENTS

| CN | 107939901 A | * | 4/2018 | ............ F16F 15/002 |
| CN | 108443382 A | * | 8/2018 | ................ F16F 6/00 |

(Continued)

OTHER PUBLICATIONS

International Search Report and Written Opinion received for PCT/GB2021/053180. Mailed: Mar. 30, 2022. 13 pages.
(Continued)

*Primary Examiner* — Edgardo San Martin
(74) *Attorney, Agent, or Firm* — Finch & Maloney PLLC (57) ABSTRACT

According to the present invention there is provided an active vibration control system comprising: an electromagnetic actuator and a control element, the electromagnetic actuator being operable to apply a force on a base structure to which the active vibration control system is attachable such that vibrations of the base structure are actively controllable by the application of said force, wherein the electromagnetic actuator and control element are relatively moveable such that the active vibration control system has at least two modes of vibration, and wherein movement of the electromagnetic actuator causes movement of at least a part of the control element.

20 Claims, 7 Drawing Sheets

(51) Int. Cl.
*F16F 7/10* (2006.01)
*F16F 7/104* (2006.01)
*F16F 15/02* (2006.01)
*F16F 15/03* (2006.01)
*H02K 33/00* (2006.01)
*H02K 33/18* (2006.01)

(52) U.S. Cl.
CPC ....... *F16F 2222/06* (2013.01); *F16F 2222/08* (2013.01); *F16F 2228/063* (2013.01); *F16F 2230/18* (2013.01)

(58) Field of Classification Search
CPC .. F16F 7/112; F16F 7/116; F16F 15/03; F16F 15/02; F16F 2222/06; F16F 2222/08; F16F 2228/06; F16F 2228/063; F16F 2228/066; F16F 2230/18; H02K 33/18; H02K 33/12; H02K 33/14; G05D 19/02; G05D 19/00
See application file for complete search history.

(56) References Cited

U.S. PATENT DOCUMENTS

| | | | | |
|---|---|---|---|---|
| 5,219,051 | A * | 6/1993 | Davis | F16F 15/023 267/221 |
| 5,433,422 | A * | 7/1995 | Ross | F16F 7/108 267/141.1 |
| 5,802,184 | A | 9/1998 | Heath | |
| 5,884,736 | A * | 3/1999 | Burdisso | F16F 7/1011 267/136 |
| 5,906,254 | A | 5/1999 | Schmidt et al. | |
| 6,009,985 | A * | 1/2000 | Ivers | F16F 7/104 244/54 |
| 6,129,185 | A * | 10/2000 | Osterberg | F16F 9/103 188/267.2 |
| 6,155,542 | A * | 12/2000 | Kato | H01L 21/68 267/136 |
| 6,354,576 | B1 * | 3/2002 | Jacobs | F16F 7/12 267/140.14 |
| 6,378,672 | B1 * | 4/2002 | Wakui | G03F 7/709 267/140.14 |
| 6,907,969 | B2 * | 6/2005 | Ichikawa | F16F 7/1011 188/380 |
| 8,573,569 | B2 * | 11/2013 | Hasegawa | F16F 7/1011 267/140.14 |
| 8,899,393 | B2 * | 12/2014 | Kraner | G05B 19/404 188/380 |
| 9,665,108 | B2 * | 5/2017 | Nawata | G05D 19/02 |
| 10,184,539 | B2 * | 1/2019 | Kraner | F16F 7/1011 |
| 10,236,109 | B1 | 3/2019 | Robertson | |
| 11,512,757 | B2 * | 11/2022 | Kordunsky | F16F 15/022 |
| 2004/0017033 | A1 | 1/2004 | Ichikawa et al. | |
| 2007/0273074 | A1 * | 11/2007 | Mizuno | F16F 15/03 267/136 |
| 2010/0030834 | A1 | 2/2010 | de Brebisson | |
| 2017/0328441 | A1 | 11/2017 | Kanaya et al. | |
| 2017/0349271 | A1 | 12/2017 | Inquiete et al. | |
| 2019/0234478 | A1 | 8/2019 | Kraner et al. | |
| 2020/0076288 | A1 | 3/2020 | Nerubenko et al. | |
| 2024/0035536 | A1 | 2/2024 | Sharkh et al. | |
| 2024/0335537 | A1 | 10/2024 | Bajgain et al. | |

FOREIGN PATENT DOCUMENTS

| | | | | |
|---|---|---|---|---|
| CN | 110219921 | A * | 9/2019 | ............... F16F 6/00 |
| FR | 2765647 | A1 | 1/1999 | |
| JP | S5874931 | A | 5/1983 | |
| JP | H1054439 | A | 2/1998 | |
| JP | 2007285429 | A * | 11/2007 | |
| WO | 2022129865 | A1 | 6/2022 | |

OTHER PUBLICATIONS

GB Search Report under Section 17(5) received for GB Application No. 2019754.7, dated May 12, 2021. 3 pages.
EP Search Report received for EP Application No. 20275179.8, dated Jul. 6, 2021. 15 pages.

* cited by examiner

VIBRATION CONTROL SYSTEMS

The present disclosure relates to vibration control systems, in particular active vibration control systems, vehicle comprising active vibration control systems, and methods of vibration control, in particular active vibration control.

BACKGROUND

The vibrations of heavy machinery, for example engines, during their operation can have an adverse effect on the structures on which said machinery is mounted. For example, the vibration of an engine mounted in vehicles including aircraft, watercraft and land-going vehicles, can impact vehicle efficiency, accuracy of instrumentation, vehicle noise, and stability.

Vibration control systems are desirable in many settings in order to mitigate the impact of the vibration. Vibration control systems provide a level of damping or operate to reduce the impact of vibrations. However, commercially available systems are complex, over-sized, or provide insufficient control or damping. Moreover, commercially available vibration control systems often have a single mode of vibration. This results in the system having limited applicability to use in controlling vibrations.

Machine vibration is known to change over time. For example, engines vibrate at different frequencies and magnitudes of force depending on the selected gear or demanded power. The ability to adjust, or "tune", commercially available control systems to deal with the changes in machine vibration is insufficient to address this problem. Moreover, the lack of predictability of commercially available vibration control systems is problematic, with extensive calibration often being required.

It is an object of the present invention to provide an improved system and/or method thereof and/or address one or more of the problems discussed above, or discussed elsewhere, or to at least provide an alternative system and/or method.

SUMMARY OF THE INVENTION

According to the present invention there is provided a system and method as set forth in the appended claims. Other features of the invention will be apparent from the dependent claims, and the description which follows.

According to a first aspect of the present invention there is provided an active vibration control system comprising: an electromagnetic actuator and a control element, the electromagnetic actuator being operable to apply a force on a base structure to which the active vibration control system is attachable such that vibrations of the base structure are actively controllable by the application of said force, wherein the electromagnetic actuator and control element are relatively moveable such that the active vibration control system has at least two modes of vibration, and wherein movement of the electromagnetic actuator causes movement of at least a part of the control element In this way, an active vibration control system is provided which has a plurality of modes of vibration, that is, at least two modes of vibration. As the electromagnetic actuator and control element are relatively movable, the system thereby has at least two degrees of freedom, and therefore at least two modes of vibration. A system having multiple modes of vibration is highly advantageous, as the system is not limited to use in controlling vibrations of a single frequency. The same system can therefore be used to control vibrations of different frequency if necessary. The present system is thus versatile. Vibrations of the base structure at various frequencies can thereby be controlled. Tuning of the vibration control is facilitated by provision of a control element which is moveable by movement of the electromagnetic actuator. Whilst the electromagnetic actuator is described as being operable to apply a force on the base structure, it will be appreciated that this encompasses the electromagnetic actuator and control element applying a force on the base structure, as a result of the movement of the electromagnetic actuator and movement of the at least part of the control element that results from operation of the electromagnetic actuator. In other words, the electromagnetic actuator and control element are operable, or moveable, to apply a force on the base structure.

The system of the first aspect of the present invention may be referred to as a multimodal inertial force actuator system.

In order to generate multimodal motion, or vibration, prior art systems employ a plurality of actuators, with each individual actuator providing movement in its own respective mode of vibration. This is complex and can lead to a bulky construction. The present system is capable of multiple modes of vibration with a single actuator. In this way, the present system is simplified and its size can be reduced. This can also reduce manufacturing costs and increase reliability.

In one example, the electromagnetic actuator comprises a coil and a moveable member comprising a permanent magnet, the coil being associated with the permanent magnet such that current flowing through the coil in the presence of the magnetic field causes movement of the moveable member.

Such electromagnetic actuators are sometimes referred to as voice coil actuators. This type of electromagnetic actuator is compact yet can be operated to generate a large force on the moveable member. In this way, high magnitude vibrations can be controlled by operation of the electromagnetic actuator. Of course, whilst the moveable member comprising the magnet is said to be caused to move by the current flow, the skilled person will appreciate that due to the nature of the Lorentz force, an alternative construction may involve the coil being free to move, that is, a moveable coil, and the moveable member instead being fixed or stationary, that is a stationary member comprising a permanent magnet. Each construction has its own benefits. The provision of a moveable member is a simpler construction, with the non-electrically connected parts being moveable.

In one example, the active vibration control system comprises a control system to control the flow of current to the electromagnetic actuator. In one example, the control system controls the flow of current to the coil of the electromagnetic actuator. The current may be an AC current. The AC current may cause the electromagnetic actuator to oscillate. The control system may be operable to control the flow of current thereby to tune, control, or adjust a mode of vibration of the active vibration control system.

In this way, an active vibration control system is provided having tuneable modes of vibration, in order to actively control vibrations of a base structure at specific frequencies and magnitudes.

In one example, the electromagnetic actuator and control element are resiliently attached so that movement of the electromagnetic actuator causes movement of the at least a part of the control element.

In this way, multiple degrees of freedom, and thus multiple modes of vibration, are provided for.

In one example, the electromagnetic actuator and control element are resiliently attached via a plurality of compliant material layers.

In this way, tuning of the modes of vibration are facilitated by appropriate choice of materials, dimensions and structural properties of the compliant material layers.

In one example, the control element is resiliently attached to the base structure.

In this way, the electromagnetic actuator can be provided distal to the base structure, allowing access thereto. This facilitates the construction of a simplified and compact active vibration control system.

In one example, the control element is an active control mechanism comprising a second electromagnetic actuator, the second electromagnetic actuator being operable to cause displacement of the at least a part of the control element relative to the electromagnetic actuator, thereby to control movement of the electromagnetic actuator.

In this way, the ability to tune the modes of vibration of active vibration control system is enhanced. Displacing the control element relative to the electromagnetic actuator can allow the modes of vibration of the system to be shifted such that the peak force generated by the system on the base structure occurs at a desired frequency. This frequency may be matched to the frequency of vibration of the base structure, caused by vibration of engines or machinery.

In one example, the control element comprises a proof-mass.

In this way, a robust and simplified active vibration control system is provided. The mass of the proof-mass can be adjusted to tune the modes of vibration. For example, different masses could be used for different applications, or scenarios.

In one example, the active vibration control system comprises a plurality of electromagnetic actuators and a common control element.

In this way, a multiple degree of freedom vibration control system is providable which is simplified and compact.

In one example, the or each electromagnetic actuator is arranged to move parallel to an axis, and the control element is arranged to move parallel to the axis. That is, where one electromagnetic actuator is provided, the actuator is arranged to move parallel to an axis, and the control element is arranged to move parallel to the same axis. In this way, longitudinal motion is facilitated. The actuator may be arranged to move toward and away from the base structure. The axis may be a vertical axis. That is, vertical motion may mean that the actuator is arranged to move upwardly or downwardly relative to a base structure. In this way, a force applied on said base structure may be a downward force or an upward force. The axis may be a horizontal axis. That is, horizontal motion may mean that the actuator is arranged to move side-to-side, or fore and aft relative to a base structure. In one example, each electromagnetic actuator is arranged to move parallel to a different axis, and the control element is arranged to move parallel to each axis. That is, where a plurality of electromagnetic actuators are provided, each actuator can be arranged to move parallel to an axis, each axis being a different axis. The common control element may be arranged to move parallel to each of the axes. Notably, simultaneous operation of the actuators may provide rotation of the control element.

In this way, a multiple degree of freedom system is provided with the degrees of freedom being oriented in the same direction, or parallel to the same axis. Such a system is particularly adept at controlling vibrations of a base structure, vibrated by the operation of machinery including engines.

According to a second aspect of the present invention there is provided an active vibration control apparatus comprising a proof-mass and a plurality of active vibration control systems.

The apparatus of the first aspect of the present invention may be referred to as a multimodal inertial force actuator apparatus.

The second aspect of the present invention may comprise any or all of the features of the first aspect of the present invention, as necessary or as desired.

In this way, an apparatus is provided which can provide vibration damping in a plurality of directions or degrees of freedom. Separate systems need not be provided, each having their own proof-mass, and as a result a more compact apparatus for controlling vibration of a base structure is provided for.

According to a third aspect of the present invention there is provided a vehicle, for example a ground-based, aquatic, or airborne vehicle, comprising an active vibration control system according to the first or second aspects of the present invention.

The third aspect of the present invention may comprise any or all of the features of the first or second aspects of the present invention, as necessary or as desired.

As mentioned above, machinery including engines mounted on vehicles cause vibrations, which can impact the operation of the vehicle. Providing a vehicle with an active vibration control system can advantageously mitigate the impact of vibrations.

The base structure of the active vibration control system, or base structures of the active vibration control apparatus, may form part of the vehicle.

In this way, active vibration control of a surface or structure of a vehicle is directly provided.

According to a fourth aspect of the present invention there is provided a method of actively controlling vibrations of a base structure comprising the steps of: providing an active vibration control system comprising: an electromagnetic actuator and a control element, the electromagnetic actuator and control element being relatively moveable such that the active vibration control system has at least two modes of vibration, and wherein movement of the electromagnetic actuator causes movement of at least a part of the control element; attaching the active vibration control system to the base structure; operating the electromagnetic actuator to apply a force on the base structure.

The fourth aspect of the present invention may comprise any or all of the features of the any previous aspects of the present invention, as necessary or as desired.

According to a fifth aspect of the present invention there is provided an active vibration control system comprising: a driving mechanism and a control mechanism comprising an electromagnetic actuator, the driving mechanism being operable to apply a force on a base structure to which the active vibration control system is attachable such that vibrations of the base structure are actively controllable by the application of said force, wherein the driving mechanism and control mechanism are relatively moveable such that the active vibration control system has at least two modes of vibration, and wherein movement of the driving mechanism causes movement of at least a part of the control mechanism.

The system of the fifth aspect of the present invention may be referred to as a tuneable multimodal inertial force actuator system.

The fifth aspect of the present invention may comprise any or all of the features of the earlier aspects of the present invention, as necessary or as desired.

In this way, an active vibration control system is provided which has a plurality of modes of vibration, that is, at least two modes of vibration. As the driving mechanism and control mechanism are relatively movable, the system thereby has at least two degrees of freedom, and therefore at least two modes of vibration. A system having multiple modes of vibration is highly advantageous, as the system is not limited to use in controlling vibrations of a single frequency. The same system can therefore be used to control vibrations of different frequency if necessary. The present system is thus versatile. Vibrations of the base structure at various frequencies can thereby be controlled. Tuning of the vibration control is facilitated by provision of a control mechanism which is moveable by movement of the driving mechanism. Operation of the control mechanism can control the amount of movement of the driving mechanism, or resistance to said movement.

In one example, the control mechanism is operable to control movement of the driving mechanism.

Controlling movement may mean providing a resistance to the movement of the driving mechanism. That is, the driving mechanism may experience a stiffness to its motion caused by operation of the control mechanism. In this way, the force applied to the base structure may be adjusted or tuned.

In one example, the modes of vibration are tuneable by operation of the control mechanism.

In this way, the control mechanism can tune the plurality of modes of vibration to control vibrations of particular frequencies or magnitudes, as desired.

In one example, the electromagnetic actuator of the control mechanism comprises a coil and a moveable member comprising a permanent magnet, the coil being associated with the permanent magnet such that current flowing through the coil in the presence of the magnetic field causes displacement of the at least a part of the control mechanism relative to the driving mechanism, thereby to control movement of the driving mechanism.

Such electromagnetic actuators are sometimes referred to as voice coil actuators. This type of electromagnetic actuator is compact yet can be operated to generate a large force on the driving mechanism. In this way, the control mechanism can provide tuning of the modes of vibration across a broad range of frequencies. Of course, whilst the moveable member comprising the magnet is said to be caused to move by the current flow, the skilled person will appreciate that due to the nature of the Lorentz force, an alternative construction may involve the coil being free to move, that is, a moveable coil, and the moveable member instead being fixed or stationary, that is a stationary member comprising a permanent magnet. Each construction has its own benefits. The provision of a moveable member is a simpler construction, with the non-electrically connected parts being moveable.

In one example, the active vibration control system comprises a control system to control the flow of current to the electromagnetic actuator. In one example, the control system controls the flow of current to the coil of the electromagnetic actuator. The current may be a DC current. The DC current may cause displacement of at least a part of the control mechanism. The control system may be operable to control the flow of current thereby to tune, control, or adjust a mode of vibration of the active vibration control system.

In this way, an active vibration control system is provided having tuneable modes of vibration, in order to actively control vibrations of a base structure at specific frequencies and magnitudes.

In one example, the coil is supplied with a DC current, thereby to cause displacement of the at least a part of the control mechanism relative to the driving mechanism.

In this way, tuning is predictable as it is a function of the DC current supplied to the coil. Moreover, DC current allows accurate control of the modes of vibration, allowing tuning of the peak force applied to the base structure to control vibration of the peak structure at particular frequencies and magnitudes.

In one example, the moveable member of the electromagnetic actuator of the control mechanism is offset from an initial position.

In this way, when the driving mechanism is oscillated, or vibrated, the resistive force provided by the control mechanism is symmetrical throughout the vibration stroke of the driving mechanism. Predictability of operation of the active vibration control system is thereby improved.

In one example, the coil comprises a plurality of coil portions, a first coil portion being supplied with a DC current in a first direction, and a second coil portion being supplied with a DC current in a second, opposite, direction.

In this way, offset of the moveable member of the electromagnetic actuator of the control mechanism is not required. This is advantageous in making the active vibration system compact.

In one example, the level of current supplied to the coil or coil portions is controllable, thereby to tune the modes of vibration of the system.

By controlling the current, the modes of vibration can be tuned to match, or damp, the vibrations of the base structure.

In one example, the driving mechanism is an active driving mechanism comprising an electromagnetic actuator. In one example, the electromagnetic actuator of the driving mechanism comprises a coil and a moveable member comprising a permanent magnet, the coil being associated with the permanent magnet such that current flowing through the coil in the presence of the magnetic field causes displacement of the moveable member, and thereby causes movement of at least a part of the control mechanism.

In this way, the magnitude of the force applied to the base structure is controllable by control of the electromagnetic actuator of the driving mechanism. Of course, whilst the moveable member comprising the magnet is said to be caused to move by the current flow, the skilled person will appreciate that due to the nature of the Lorentz force, an alternative construction may involve the coil being free to move, that is, a moveable coil, and the moveable member instead being fixed or stationary, that is a stationary member comprising a permanent magnet. Each construction has its own benefits. The provision of a moveable member is a simpler construction, with the non-electrically connected parts being moveable.

In one example, the driving mechanism and control mechanism are resiliently attached. In one example, the active vibration control system is resiliently attached to the base structure. In one example, the control mechanism is resiliently attached to the base structure.

In this way, a multiple degree of freedom system is provided, that is, a system having multiple modes of vibration.

According to a sixth aspect of the present invention there is provided an active vibration control apparatus comprising a proof-mass and a plurality of active vibration control systems according to the fifth aspect of the present invention.

In this way, an apparatus is provided which can provide vibration damping in a plurality of directions or degrees of freedom. Separate systems need not be provided, each having their own proof-mass, and as a result a more compact apparatus for controlling vibration of a base structure is provided for.

The apparatus of the fifth aspect of the present invention may be referred to as a tuneable multimodal inertial force actuator apparatus.

According to a seventh aspect of the present invention there is provided a vehicle, for example a ground-based, aquatic, or airborne vehicle, comprising an active vibration control system or active vibration control apparatus according to the present aspect of the present invention.

The seventh aspect of the present invention may comprise any or all features of any fifth or sixth aspects of the present invention, as necessary or as desired.

According to an eighth aspect of the present invention there is provided a method of actively controlling vibrations of a base structure, comprising the steps of: providing an active vibration control system comprising a driving mechanism and a control mechanism comprising an electromagnetic actuator, wherein the driving mechanism and the control mechanism are relatively moveable such that the active vibration control system has at least two modes of vibration, and wherein movement of the driving mechanism causes movement of at least a part of the control mechanism; attaching the active vibration control system to the base structure; and operating the driving mechanism to apply a force on the base structure.

The eighth aspect of the present invention may comprise any or all features of any previous aspect of the present invention, as necessary or as desired.

According to a ninth aspect of the present invention there is provided an active vibration control system comprising: an electromagnetic actuator; a magnetic element; and a solenoid, the electromagnetic actuator being operable to apply a force on a base structure to which the active vibration control system is attachable such that vibrations of the base structure are actively controllable by the application of said force, wherein the electromagnetic actuator is operable to cause movement of the magnetic element through the solenoid and the solenoid is operable to apply a force on the magnetic element.

The system of the ninth aspect of the present invention may be referred to as a tuneable electromagnetic actuator and solenoid actuator system.

The ninth aspect of the present invention may comprise any or all of the features of any previous aspect of the present invention, as necessary or as desired.

Advantageously, the vibration of the electromagnetic actuator can be controlled by operation of the solenoid, which operates to apply a force on the magnetic element. In this way, the vibrations of the base structure on which the electromagnetic actuator is operable to apply a force are controllable by operation of the solenoid. The peak force and frequency of the force is tuneable by operation of the solenoid.

In one example, the electromagnetic actuator comprises a coil and a moveable member comprising a permanent magnet, the coil being associated with the permanent magnet such that current flowing through the coil in the presence of the magnetic field causes displacement of the moveable member, thereby to cause movement of the magnetic element through the solenoid to apply a force on the solenoid and thereby on the base structure.

Of course, whilst the moveable member comprising the magnet is said to be caused to move by the current flow, the skilled person will appreciate that due to the nature of the Lorentz force, an alternative construction may involve the coil being free to move, that is, a moveable coil, and the moveable member instead being fixed or stationary, that is a stationary member comprising a permanent magnet. Each construction has its own benefits. The provision of a moveable member is a simpler construction, with the non-electrically connected parts being moveable.

In one example, the active vibration control system comprises a control system operable to control the flow of current to the electromagnetic actuator and/or the flow of current to the solenoid. In one example, the control system controls the flow of current to the coil of the electromagnetic actuator and/or the flow of current to the solenoid. In one example the control system is operable to control the flow of current thereby to tune, control, or adjust a mode of vibration of the active vibration control system. In one example, the electromagnetic actuator is supplied with an AC current, and the solenoid is supplied with a DC current. In one example, the solenoid is operable to apply a force on the magnetic element thereby to oppose movement of the magnetic element through the solenoid.

The AC current may cause the magnetic element to oscillate. The DC may result in the application of a force on the magnetic element which is constant in direction, and changes in magnitude as the magnetic element moves further through, that is, into, the solenoid.

In this way, an active vibration control system is provided having tuneable modes of vibration, in order to actively control vibrations of a base structure at specific frequencies and magnitudes.

In one example, the magnetic element is connected, for example fixedly or resiliently connected, to the moveable member of the electromagnetic actuator.

The magnetic element being fixedly connected to the moveable member facilitates a construction having a single degree of freedom. The magnetic element being resiliently connected to the moveable member facilitates a construction having a plurality of degrees of freedom. In both cases, in this way, movement of the moveable member brings the magnetic element towards and away from the magnetic field of the solenoid, such that the force applied to the magnetic element is variable. Thus, the vibration, or more generally, movement of the moveable member is effected, as the moveable member experiences a resistive, or opposing, force to its motion. By controlling the level of the resistive force, the peak force magnitude and frequency is tuneable.

In one example, the solenoid is attached, for example fixedly or resiliently attached, to the base structure.

In this way, movement of the magnetic member through the magnetic field of the solenoid results in a force being applied to the base structure via the solenoid which is attached to the base structure. The solenoid being fixedly attached to the base structure facilitates a construction having a single degree of freedom. Robustness is also improved. The solenoid being resiliently attached to the base structure facilitates a construction having a plurality of degrees of freedom.

In one example, the magnetic element is operably connected to a shaft, the shaft being resiliently attached in the active vibration control system.

In this way, the magnetic element is biased toward an equilibrium position. Moreover, the maximal extent of the magnetic element into the solenoid is limited by the shaft, and thus the system is kept compact.

In one example, the solenoid is operable to apply negative stiffness.

In this way, the frequency of the peak force applicable by the active vibration control system is tuneable.

According to a tenth aspect of the present invention there is provided an active vibration control apparatus comprising a proof-mas and a plurality of active vibration control systems according to the ninth aspect of the present invention. In one example, ach active vibration control system is resiliently connected to the proof-mass.

In this way, an apparatus is provided which can provide vibration damping in a plurality of directions or degrees of freedom. Separate systems need not be provided, each having their own proof-mass, and as a result a more compact apparatus for controlling vibration of a base structure is provided for.

The apparatus of the tenth aspect of the present invention may be referred to as a tuneable electromagnetic actuator and solenoid actuator apparatus.

According to an eleventh aspect of the present invention there is provided a vehicle, for example a ground-based, aquatic, or airborne vehicle, comprising an active vibration control system or active vibration control apparatus according to the ninth or tenth aspect of the present invention.

The base structure of the active vibration control system, or base structures of the active vibration control apparatus, may form part of the vehicle.

In this way, active vibration control of a surface or structure of a vehicle is directly provided.

According to a twelfth aspect of the present invention there is provided a method of actively controlling vibrations of a base structure, comprising the steps of: providing an active vibration control system comprising an electromagnetic actuator, a magnetic element, and a solenoid, wherein the electromagnetic actuator is operable to cause movement of the magnetic element through the solenoid and the solenoid is operable to apply a force on the magnetic element; attaching the active vibration control system to the base structure; and operating the electromagnetic actuator to apply a force on the base structure.

The twelfth aspect of the present invention may comprise any or all of the features of any previous aspect of the present invention, as necessary or as desired.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

For the avoidance of doubt, each of FIGS. 1, 3, 4, 7 and 11 show active vibration control systems 100, 300, 400, 500, 100a, 100b in an axisymmetric cross-sectional view. That is, the view is not of a full cross-section through the respective system but is in fact a cross-sectional view of one half of a symmetric cross section through a symmetric (in this case, cylindrical) system. This is made clearer by reference to FIG. 6, which illustrates a perspective view of an active vibration control system with a section removed to reveal the interior of the system. As will be understood, each cross section illustrates a cross section through the system from a central axis out to a radial extent of the system.

Figure 1:
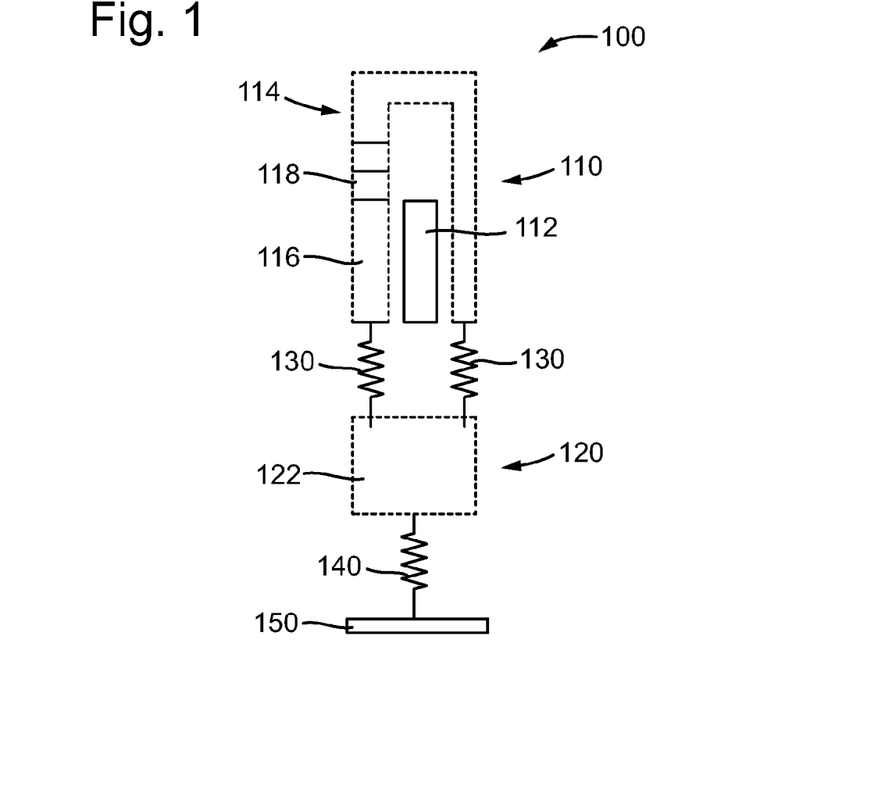
FIG. 1 shows an axisymmetric cross-sectional view of an active vibration control system comprising a control element.

Referring to FIG. 1, a first exemplary embodiment of an active vibration control system 100 is shown. The active vibration control system 100 comprises a driving mechanism in the form of an electromagnetic actuator 110. The active vibration control system 100 further comprises a control element 120. The electromagnetic actuator 110 is operable to apply a force on a base structure 150 to which the active vibration control mechanism 100 is attachable such that vibrations of the base structure 150 are actively controllable by the application of said force. The electromagnetic actuator 110 and control element 120 are relatively moveable such that the active vibration control system 100 has at least two modes of vibration. Movement of the electromagnetic actuator 110 causes movement of at least a part of the control element 120.

In this exemplary embodiment, the electromagnetic actuator 110 is a voice coil actuator. Electromagnetic actuators are used in a wide variety of applications to produce motion in response to an electric current. Voice coil actuators are well known in the field. A voice coil actuator is an example of a single-phase, two terminal, direct drive device. The voice coil actuator comprises a fixedly mounted coil 112 and a moveable member 114. The moveable member 114 comprises a body 116 formed from a ferrous material, in this case steel, and a permanent magnet 118. The permanent magnet 118 comprises a north pole and a south pole. These pair of poles may be referred to as a magnetic pole pair. The moveable member 114 may otherwise be referred to as a proof-mass. Alternatively, the term proof-mass may be used to refer to a mass which forms part of a passive control element. Whilst in this exemplary embodiment, and the other exemplary embodiments described herein, the actuator 110 is a cylindrical actuator, it will of course be appreciated that the actuators may be cuboidal, or any other suitable shape. That is, the components may form a cylinder or rectangular prism, or may be housed in a cylindrical or cuboidal housing.

The coil 112 is for carrying current provided by a power supply (not shown). Current flowing through the coil 112 in the presence of the permanent magnetic field produces a force which acts on the moveable member 114, thereby causing movement of the moveable member 114. That is, in use, when current flows through the coil 112, the presence of the moving charge in the magnetic field of the magnet 118 generates a Lorentz force which acts on the magnet 118 and, via the magnet 118, the moveable member 114. The magnitude of the force which acts on the moveable member 114 is proportional to the current through the coil 112. In this example, the power supply is an AC power supply, which supplies an alternating current to the coil 112. The alternating current provided to the coil 112 results in the production of a force which also alternates in direction. In this way, the moveable member 114 oscillates with the frequency of the applied alternating current.

In this exemplary embodiment and the embodiments which follow, whilst the moveable member comprising the magnet is said to be caused to move by the current flow, the skilled person will appreciate that due to the nature of the Lorentz force, an alternative construction may involve the coil being free to move, that is, a moveable coil, and the moveable member instead being fixed or stationary, that is a stationary member comprising a permanent magnet. Each construction has its own benefits. The provision of a moveable member is a simpler construction, with the non-electrically connected parts being moveable.

In the first exemplary embodiment of the active vibration control system 100, the control element 120 is a passive control element in the form of a proof-mass 122. Nevertheless, the person skilled in the art will appreciate that alternative control elements, including control mechanisms, may be employed, by which the benefits of the invention may be similarly realised. The electromagnetic actuator 110 and proof-mass 122 are resiliently attached by springs 130. In this way, the above described movement of the moveable member 114 causes movement of the proof-mass 122.

The active vibration control system 100 is attached to the base structure 150 by virtue of a spring 140 connecting the proof-mass 122 to the base structure 150. When the electromagnetic actuator 110 is driven to cause movement of the moveable member 114, movement of the proof-mass 122 is also caused by virtue of the resilient connection between the electromagnetic actuator 110 and proof-mass 122. That is, movement of the moveable member 114 results in the application of a force on the proof-mass 122. The movement of the proof-mass 122 thereby results in the application of a force on the base structure 150 to which the proof-mass is resiliently attached by virtue of the spring 140.

The electromagnetic actuator 110 is arranged to be driven in a direction parallel to a first axis, which in this exemplary embodiment is a vertical axis. The control element 120, which in this exemplary embodiment is the proof-mass 122, is similarly arranged to move in a direction parallel to the first axis. Owing to the resilient connection between the electromagnetic actuator 110 and the control element 120, and the resilient connection between the control element 120 and the base structure 150, the active vibrational control system 100 has multiple degrees of freedom, and thus multiple modes of vibration.

In this exemplary embodiment, the active vibration control system 100 is a two degree of freedom system and has two modes of vibration. It will be appreciated that "degree of freedom" as used herein refers to independent parameter which can be used to describe a movement of a body from a first position to a second position in three-dimensional space. Thus a degree of freedom may be one of three translation movements (x, y, z) or one of three rotational movements (Rx, Ry, Rz). A mode of vibration is where the moveable member 114 and proof-mass 122 move with the same frequency and with a fixed phase relationship. Both degrees of freedom are in the same coordinate direction, that is, parallel to the first axis. In a first mode of vibration, the moveable member 114 and proof-mass 122 oscillate in-phase with one another. In a second mode of vibration, the moveable member 114 and proof-mass 122 oscillate out-of-phase with one another. The driving frequency at which this occurs is known as the natural, or resonance, frequency of the system.

Figure 2:
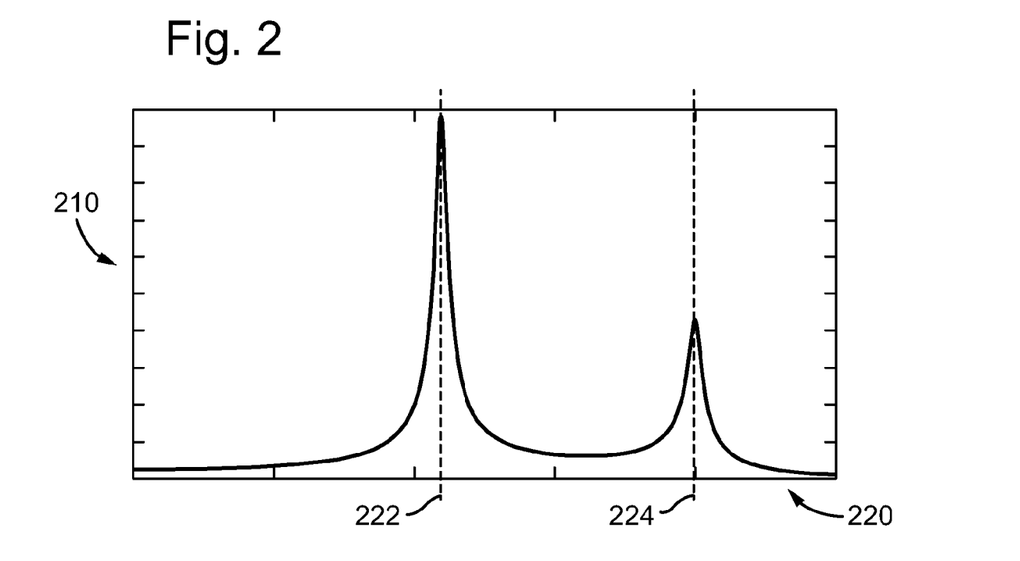
FIG. 2 shows a graph of displacement amplitude of the control element vs frequency for the system of FIG. 1.

Referring to FIG. 2, the force applied to the base structure, indicated on the y-axis at 210, is shown against the driving frequency of the electromagnetic actuator 110, indicated on the x-axis at 220. As can be seen from the figure, two peaks in the force applied to the base structure 222, 224 exist where the driving frequency of the electromagnetic actuator 110 coincides with either of the frequencies of the first and second modes of vibration of the active vibration control system 100.

Figure 3:
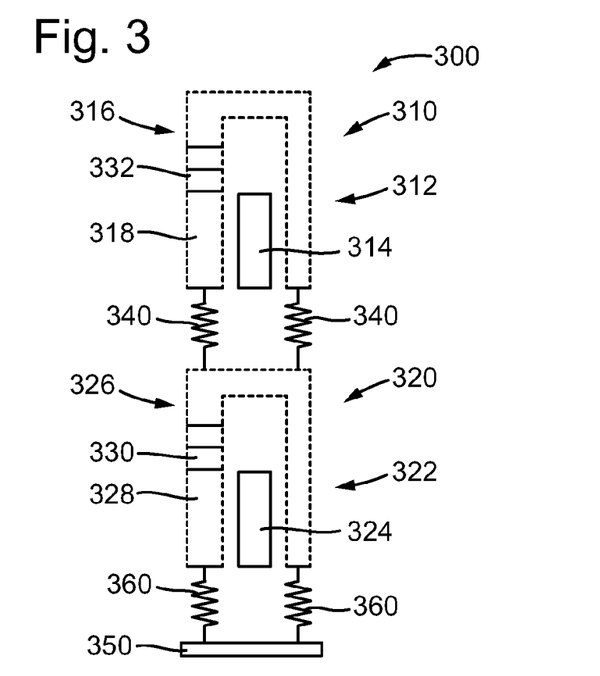
FIG. 3 shows an axisymmetric cross-sectional view of an active vibration control system comprising a control mechanism.

Referring to FIG. 3, a second exemplary embodiment of an active vibration control system 300 is shown. The active vibration control system 300 comprises a driving mechanism 310 and a control mechanism 320. The control mechanism 320 comprises an electromagnetic actuator 322. The driving mechanism 310 is operable to apply a force on a base structure 350 to which the active vibration control system 300 is attachable, such that vibrations of the base structure 350 are actively controllable by the application of said force. The driving mechanism 310 and control mechanism 320 are relatively moveable such that the active vibration control system 300 has at least two modes of vibration. Movement of the driving mechanism 310 causes movement of at least a part of the control mechanism 320.

In this exemplary embodiment, the control mechanism 320 comprises an electromagnetic actuator 322 in the form of a voice coil actuator. The voice coil actuator is identical in construction to that described above in relation to FIG. 1, although here forms part of the control mechanism 320. That is, the voice coil actuator of the control mechanism 320 comprises a fixedly mounted coil 324 and a moveable member 326. Again, as mentioned above, in alternative constructions, it may be the coil 324 which is moveable, and the member 326 which is fixedly mounted. The skilled person will appreciate that this is facilitated by the nature of the Lorentz force. The moveable member 326 comprises a body 328 formed from a ferrous material, in this case, steel, and a permanent magnet 330. The coil 324 is for carrying current provided by a power supply (not shown). The power supply for the control mechanism 320 is a DC power supply, which supplies a direct current to the coil 324. The direct current provided to the coil 324 results in the production of a force acting on the moveable member 326 which is constant in direction. In this way, the moveable member 326 is driven to be displaced away from its initial, or equilibrium, position.

In the second exemplary embodiment, the driving mechanism 310 is an active driving mechanism comprising an electromagnetic actuator, specifically, a further voice coil actuator. Nevertheless, the person skilled in the art will appreciate that alternative driving mechanism may be employed, by which the benefits of the invention may be similarly realised. The voice coil actuator of the driving mechanism 310 will be referred to as the "first voice coil actuator 312" and the voice coil actuator of the control mechanism 320 will be referred to as the "second voice coil actuator 322". The first voice coil actuator 312 is identical in construction to the second voice coil actuator 322. That is, the first voice coil actuator 312 comprises a fixedly mounted coil 314 and a moveable member 316. Again, as mentioned above, in alternative constructions, it may be the coil 324 which is moveable, and the member 326 which is fixedly mounted. The skilled person will appreciate that this is facilitated by the nature of the Lorentz force. The moveable member 316 comprises a body 318 formed from a ferrous material, in this case, steel, and a permanent magnet 332. The coil 314 is for carrying current provided by a power supply (not shown). The power supply for the first voice coil actuator 312 is an AC power supply, which supplies an alternating current to the coil 314. The alternating current provided to the coil 314 results in the production of a force acting on the moveable member 316 which also alternates in direction. In this way, the moveable member 316 oscillates with the frequency of the applied alternating current.

The first voice coil actuator 312 and second voice coil actuator 322 are resiliently attached by springs 340. In this way, the above described movement of the moveable member 316 of the first voice coil actuator 312 causes movement of the moveable member 326 of the second voice coil actuator 322.

The displacement of the moveable member 326 of the second voice coil actuator 322 caused by the movement of the moveable member 316 of the first voice coil actuator 312 is dependent upon the position of the moveable member 326 of the second voice coil actuator 322 relative to its coil 324. That is, the moveable member 316 of the first voice coil actuator 312 experiences a force opposing its movement, and the force experienced by the moveable member 316 varies as a function of the displacement of the moveable member 326 of the second voice coil actuator 322 from its initial position. By controlling the DC current supplied to the coil 324 of the second voice coil actuator 322, the displacement of the moveable member 326 of the second voice coil actuator 322 from its initial position is adjustable. The stiffness experienced by the first voice coil actuator 312 is thereby also adjustable as a function of the DC current, and thus the frequencies of the modes of vibration of the active vibration control system 300 are tuneable.

The active vibration control system 300 is attached to the base structure 350 by virtue of springs 360 connecting the moveable member 326 of the second voice coil actuator 322 to the base structure 350. When the first voice coil actuator 312 is driven to cause movement of the moveable member 316, movement of the moveable member 326 of the second voice coil actuator 322 thereby results, by virtue of the resilient connection between the actuators. That is, movement of the moveable member 316 of the first voice coil actuator 312 results in the application of a force on the moveable member 326 of the second voice coil actuator 322. The movement of the moveable member 326 of the second voice coil actuator 322 thereby results in the application of a force on the base structure 350 to which the moveable member 326 of the second voice coil actuator 322 is resiliently attached by the springs 360.

It has been observed that the initial (that is, equilibrium) position of the coil 324 and moveable member 326 of the second voice coil actuator 322 resulted in an asymmetrical force opposing movement of the first voice coil actuator 312. This is due to the asymmetrical manner in which the moveable member 326 of the second voice coil actuator 322 interacts with the magnetic field of the coil 324 as the moveable member 326 is displaced from its initial position. This introduced non-linearity into the system can impact the predictability of the force production of the system 300, thus impacting tunability of the modes of vibration of the system 300. In order to mitigate this, the moveable member 326 of the second voice coil actuator 322 can be offset from its initial position. In doing so, the force relationship is made more symmetrical, and thus tunability is improved.

Figure 4:
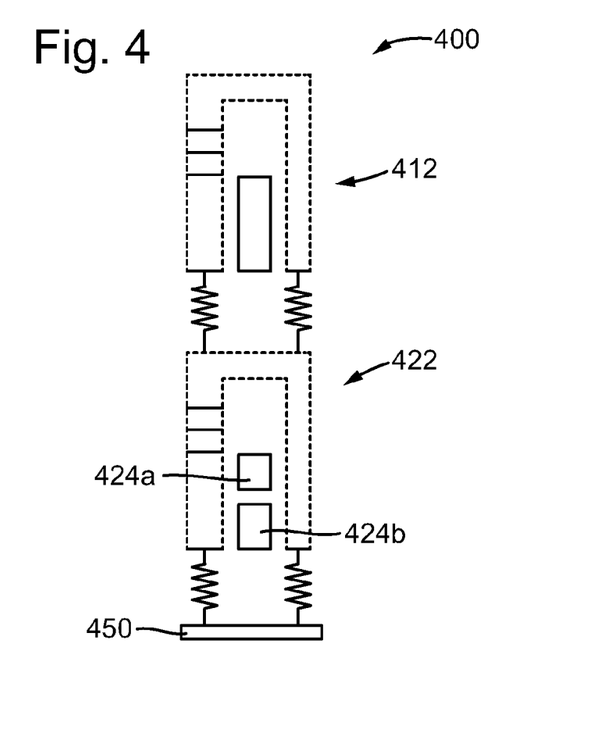
FIG. 4 shows an axisymmetric cross-sectional view of active vibration control system comprising a control mechanism.

Referring to FIG. 4, a third exemplary embodiment of an active vibration control system 400 is shown. The active vibration control system 400 of the third exemplary embodiment is similar in construction to the second exemplary embodiment, and so unnecessary repetition of description of its functionality will be avoided.

As before, the active vibration control system 400 comprises a first voice coil actuator 412 and a second voice coil actuator 422. The active vibration control system 400 is attached to a base structure 450. Notably, in the third exemplary embodiment, the second voice coil actuator 422 comprises a plurality of fixedly mounted coils 424a, 424b. In this exemplary embodiment, the second voice coil actuator 422 comprises two coils 424a, 424b, although the skilled person will appreciate from the description which follows that benefits may be obtained by providing more than two coils.

A first one of the two coils 424a, 424b is provided with a power supply from a DC power source (not shown). The DC power source is arranged to provide the first one of the two coils with a DC current in a first direction. A second one of the two coils 424a, 424b is also provided with a power supply from a DC power source (not shown). However, the DC current supplied to the second one of the two coils 424a, 424b is in an opposite direction to the current supplied to the first one of the two coils 424a, 424b.

In the second exemplary embodiment of the active vibration control system 300, when a DC current is supplied to the coil 324 of the second voice coil actuator 322, the moveable member 326 is displaced from its initial position by the resulting force. In some cases, this impacted predictability and tunability of the modes of vibration. However, in the third exemplary embodiment of the active vibration control system 400, when the DC currents are simultaneously and equally applied to both coils 424a, 424b, the moveable member of the second voice coil actuator 422 is not displaced from its initial position because of the opposing forces generated by virtue of the current through each coil 424a, 424b being opposite in direction. In this way, the size of the active vibration control system 400 can be reduced as the displacement of the moveable member from its initial position is prevented. Moreover, the ability to tune the resonance frequencies of the active vibration control system 400 is improved. Additionally, such an arrangement provides for functionality wherein the direction of the current through each coil 424a, 424b can be reversed, and in doing so, the resonance frequencies of the active vibration control system 400 can be increased or reduced.

Figure 5:
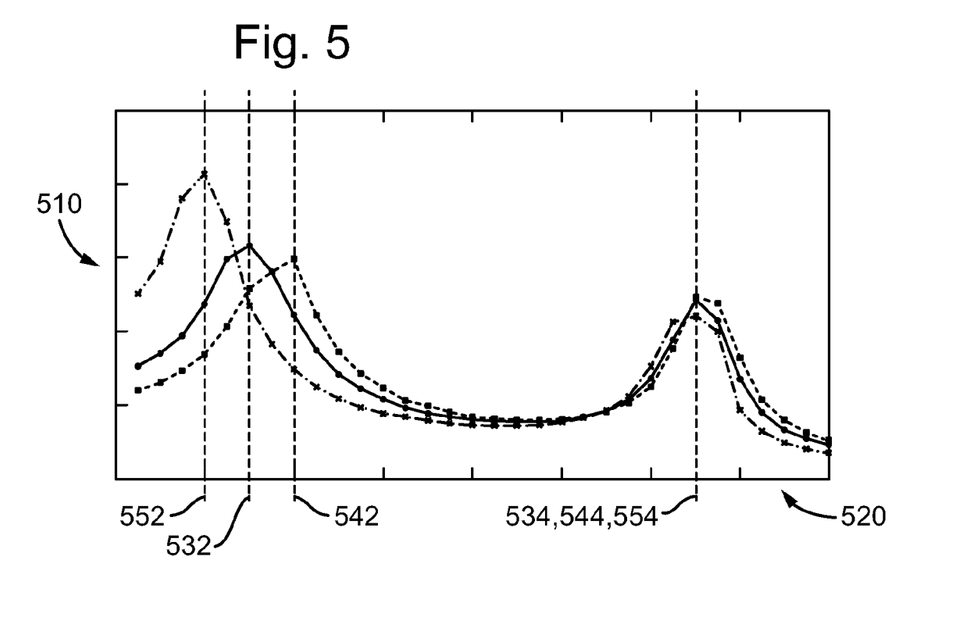
FIG. 5 shows a graph of displacement amplitude of the control mechanism vs frequency for the system of FIG. 4.

Referring to FIG. 5, the force applied to the base structure 450, indicated on the y-axis at 510, is shown against the frequency of oscillation of the first voice coil actuator 412, indicated on the x-axis at 520. As can be seen from the figure, the resonance frequency of the system 400, and thus the frequency at which peak force occurs, can be tuned by the application of a DC current. Lines 532, 534 indicate the frequency at which the peak force on the base structure 450 is produced where no DC current is applied to either coil 424a, 424b. Lines 542, 544 indicate the frequency at which the peak force on the base structure 450 is produced where a first level of DC current is applied to both coils 424a, 424b. Lines 552, 554 indicate the frequency at which the peak force on the base structure 450 is produced where a same first level of DC current is applied to both 424a, 424b, but the directions of the current through each coil 424a, 424b are swapped, as described above.

Figure 6:
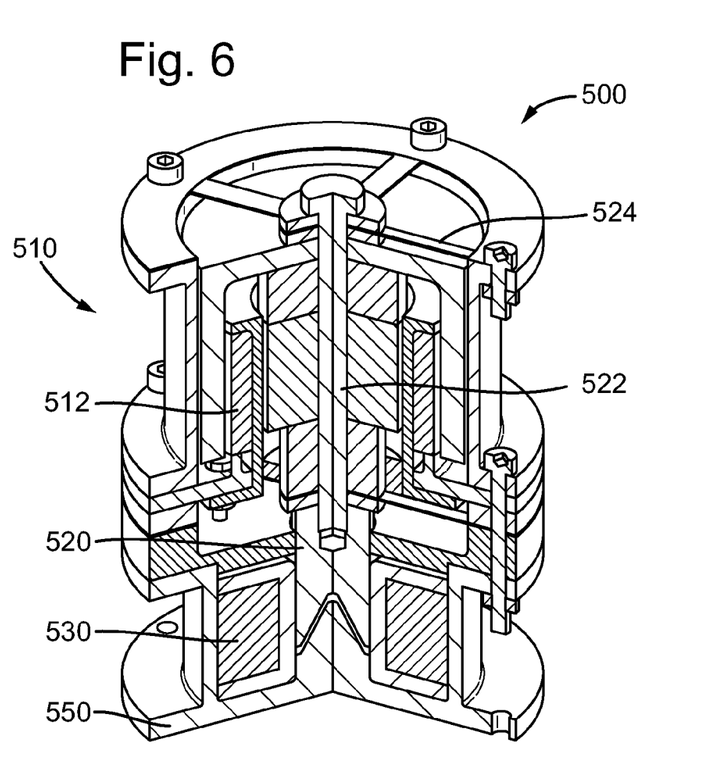
FIG. 6 shows a perspective view of an active vibration control system comprising an electromagnetic actuator, a magnetic element and a solenoid, the system shown with a section removed to reveal the interior of the system.
Figure 7:
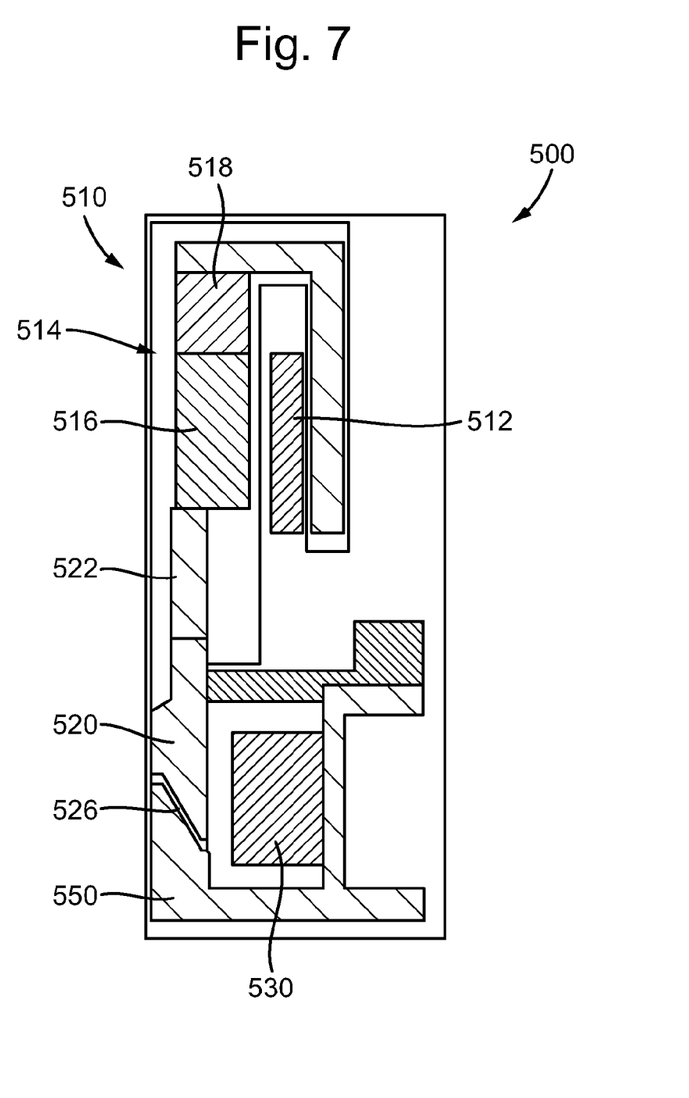
FIG. 7 shows an axisymmetric cross-sectional view of the active vibration control system of FIG. 6.

Referring to FIGS. 6 and 7, a fourth exemplary embodiment of an active vibration control system 500 is shown. The active vibration control system 500 comprises an electromagnetic actuator 510, a magnetic element 520 and a solenoid 530. The electromagnetic actuator 510 is operable to apply a force on a base structure 550 to which the active vibration control system 500 is attachable such that vibrations of the base structure 550 are actively controllable by the application of said force. The electromagnetic actuator 510 is operable to cause movement of the magnetic element 520 through the solenoid 530. The solenoid 530 is operable to apply a force on the magnetic element 520.

In this exemplary embodiment, the electromagnetic actuator 510 is a voice coil actuator. The voice coil actuator comprises a fixedly mounted coil 512 and a moveable member 514. The moveable member 514 comprises a body 516 formed from a ferrous material, in this case, steel, and a permanent magnet 518.

The coil 512 is for carrying current provided by a power supply (not shown). Current flowing through the coil 512 in the presence of the permanent magnetic field produces a force which acts on the moveable member 514, thereby causing movement of the moveable member 514. The magnitude of the force which acts on the moveable member 514 is proportional to the current through the coil 512. In this example, the power supply is an AC power supply, which supplies an alternating current to the coil 512. The alternating current provided to the coil 512 results in the production of a force which also alternates in direction. In this way, the moveable member 514 oscillates with the frequency of the applied alternating current.

The body 516 of the electromagnetic actuator 510 is connected to a shaft 522 at a first end of the shaft 522, and the second end of the shaft 522 is connected to the magnetic element 520. The shaft extends through the electromagnetic actuator 510 and projects therefrom. The magnetic element 520 extends from the end of the shaft 522 and into the solenoid 530. Movement of the moveable member 514 thereby causes movement of the shaft 522, and thereby causes movement of the magnetic element 520 through the solenoid. In this way, the electromagnetic actuator 510 is operable to cause movement of the magnetic element 520 through the solenoid. The shaft is resiliently attached in the active vibration control system 500 by a cruciform spring 524.

The solenoid 530 is for carrying current provided by a power supply (not shown). Current flowing through the solenoid 530 generates a magnetic field. The magnetic field attracts the magnetic element 520. The magnitude of the attraction is a function of the extent to which the magnetic element 520 extends through the solenoid 530. That is, the further away the magnetic element 520 is from the centre of the solenoid 530, the lower the force resistive to the motion of the magnetic element 520 is experienced by the magnetic element 520. Conversely, the closer the magnetic element 520 is to the centre of the solenoid 530, the greater the resistive force experienced by the magnetic element 530. This can be referred to as the magnetic element 520 experiencing a negative stiffness.

The power supply to the solenoid 530 is a DC power supply, which supplies a direct current to the solenoid 530. The greater the DC current supplied to the solenoid 530, the more the magnetic element 520 is drawn toward the centre of the solenoid 530, and the magnetic element 520 is thereby allowed to extend further into the solenoid. Conversely, the lower the DC current supplied to the solenoid 530, the more the magnetic element 520 is forced away from the centre of the solenoid 530. That is, the resistive force, or stiffness, experienced by the magnetic element 520 is increased by reducing the vertical displacement between the magnetic element and solenoid. The vertical displacement, or "airgap", is indicated by numeral 526.

In this way, by varying the DC current supplied to the solenoid 530, the natural frequency of oscillation of the electromagnetic actuator 510 can be controlled. Thus, the frequency at which maximum force is applied to the base structure 550 is controllable, or tuneable. Thus, vibrations of the base structure 550 can be actively controlled.

Figure 8:
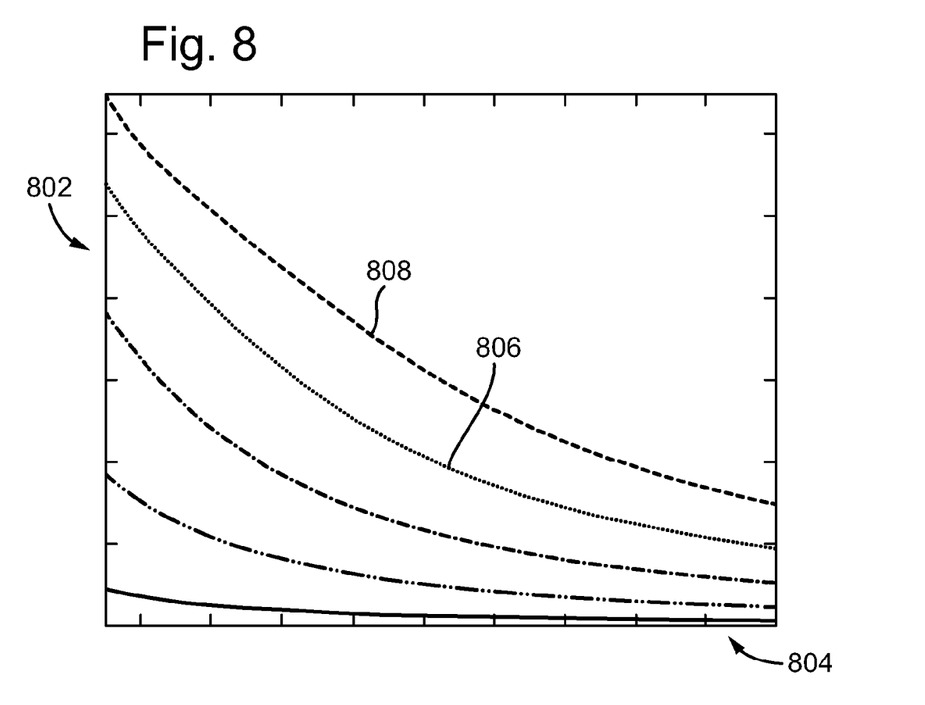
FIG. 8 shows plots of force production vs displacement for the system of FIG. 6.

As shown in FIG. 8, the force 802 produced by the solenoid 530 as a function of the vertical displacement 804 is non-linear. The multiple plots show force 802 vs displacement 804 for varying DC currents applied to solenoid 530. The magnitude of the force 802 is shown to be larger where the current applied to the solenoid 530 is higher, such as in plots 806, 808, for the same vertical displacement 804.

Figure 9:
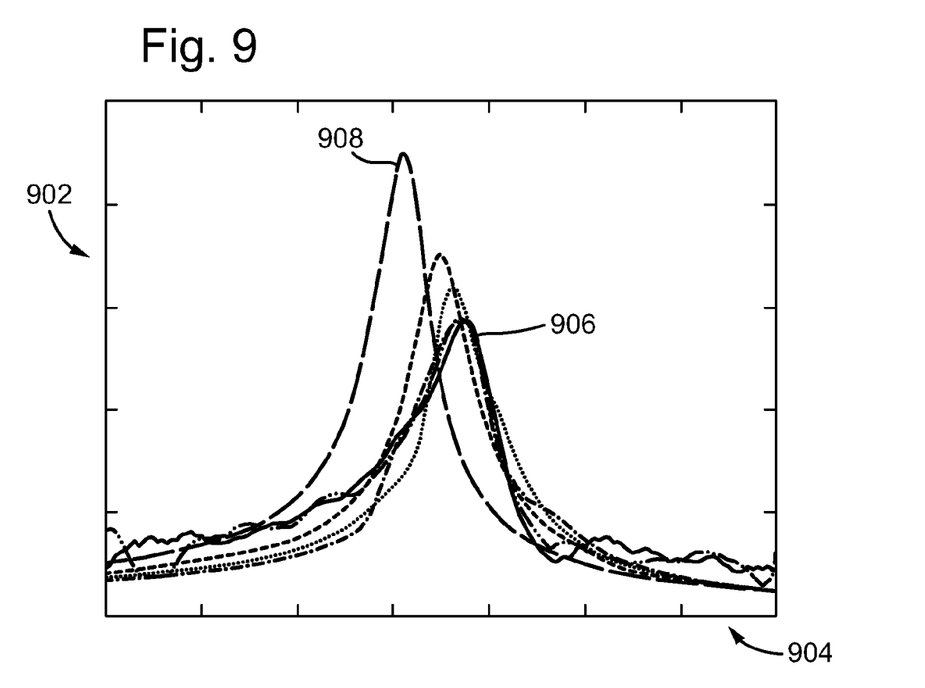
FIG. 9 shows a graph of displacement amplitude of the driving mechanism vs frequency for the system of FIG. 6, where the control mechanism exhibits a linear stiffness.

Referring to FIG. 9, the magnitude of the displacement 902 from the initial position of the moveable member 514 of the electromagnetic actuator 510 is shown against frequency 904, for varying DC currents. FIG. 9 shows the relationship between displacement 902 and frequency 904 where the electromagnetic actuator 510 exhibits a linear stiffness, that is, where the force experienced by the moveable member 514 varies linearly with the displacement of the moveable member 514 from its initial position. Plot 906 shows a plot of displacement 902 vs frequency 904 when the solenoid 530 is provided with a zero DC current. Plot 908 shows a plot of displacement 902 vs frequency 904 when the solenoid is provided with a non-zero DC current. As shown, maximum displacement occurs at a lower resonance frequency when non-zero DC current is applied. That is, increasing the DC current reduces the resonance frequency. However, by decreasing the DC current, the resonance frequency of the electromagnetic actuator 510 is shifted to higher frequencies. Conversely, increasing the DC current shifts the resonance frequency of the electromagnetic actuator 510 to lower frequencies, but results in greater displacement. Where the electromagnetic actuator 510 has a linear stiffness, increasing the DC current in the solenoid 530 results in a reduction in the resonance frequency of the system. As shown, by tuning the DC current supplied to the solenoid 530, the resonance frequency of the electromagnetic actuator 510, and thus the force applied to the base structure 550 by the active vibration control system 500, can be tuned.

Figure 10:
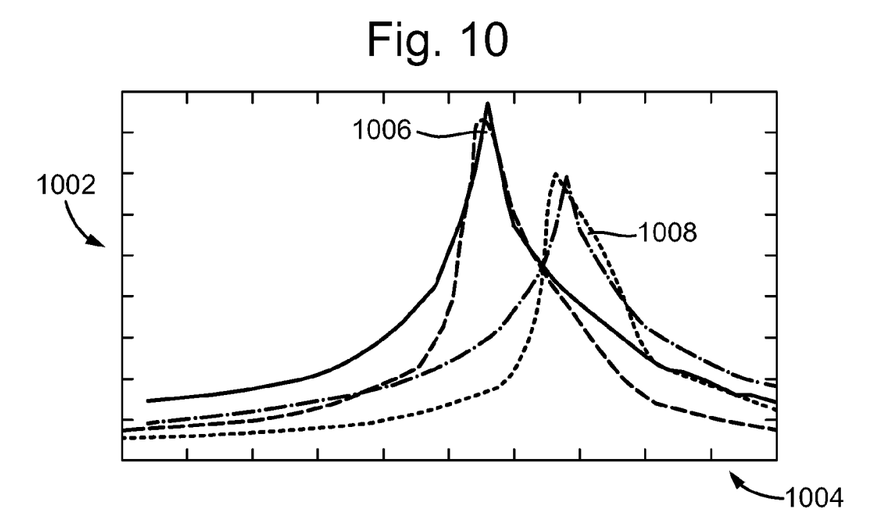
FIG. 10 shows a graph of displacement amplitude of the driving mechanism vs frequency for the system of FIG. 6, where the control mechanism exhibits a non-linear stiffness.

Referring to FIG. 10, the magnitude of the displacement 1002 from the initial position of the moveable member 514 of the electromagnetic actuator 510 is shown against frequency 1004, for varying DC currents. FIG. 10 shows the relationship between displacement 1002 and frequency 1004 in the case where the electromagnetic actuator 510 exhibits a non-linear stiffness, that is, where the force experienced by the moveable member 514 varies non-linearly with the displacement of the moveable member 514 from its initial position. Plot 1006 shows a plot of displacement 1002 vs frequency 1004 when the solenoid 530 is provided with a first level of DC current. Plot 1008 shows a plot of displacement 1002 vs frequency 1004 when the solenoid 530 is provided with a second level of DC current, the second level being higher than the first level. As shown, a maximum displacement occurs at a lower resonance frequency at the first, lower, level of DC current. However, by increasing the DC current, the resonance frequency of the electromagnetic actuator 510 is shifted to higher frequencies. Additionally, the magnitude of the displacement (notably, the peak displacement) can be seen to reduce with increasing DC current. As shown, by tuning the DC current supplied to the solenoid 530, the resonance frequency of the electromagnetic actuator 510, and thus the force applied to the base structure 550 by the active vibrational control system 500, can be tuned. It is notable that where the electromagnetic actuator 510 has a nonlinear stiffness characteristic, increasing the current in the solenoid 530 may change the operation range and hence the fundamental resonance frequency of the actuator 510. Whether increasing the DC current reduces or increases the resonance frequency depends on the nonlinear characteristics of the system.

Applicable to all embodiments described above, each active vibration control system comprises a control system to control the flow of current to the or each coil. The control system comprises one or more sensors arranged to detect the location of the moveable members within the electromagnetic actuator.

Also applicable to all embodiments described above, an active vibration control apparatus may comprise a plurality of the active vibration control systems described above. That is, each apparatus may comprise a plurality of electromagnetic actuators and control elements, or driving mechanisms and control mechanisms, or electromagnetic actuators, magnetic elements and solenoids. Each active vibration control system in the apparatus can be arranged to produce a force that acts on a proof-mass, the proof-mass being mounted for movement in at least two degrees of freedom. In one exemplary embodiment, the proof-mass is mounted for movement in six degrees of freedom, that is, three translational degrees of freedom and three rotational degrees of freedom. In an exemplary embodiment, the proof-mass is a cuboidal mass, and the apparatus comprises three active vibration control systems, each active vibration control system associated with each translational axis of the cuboid. In this way, an apparatus having numerous modes of vibration is provided.

Figure 11:
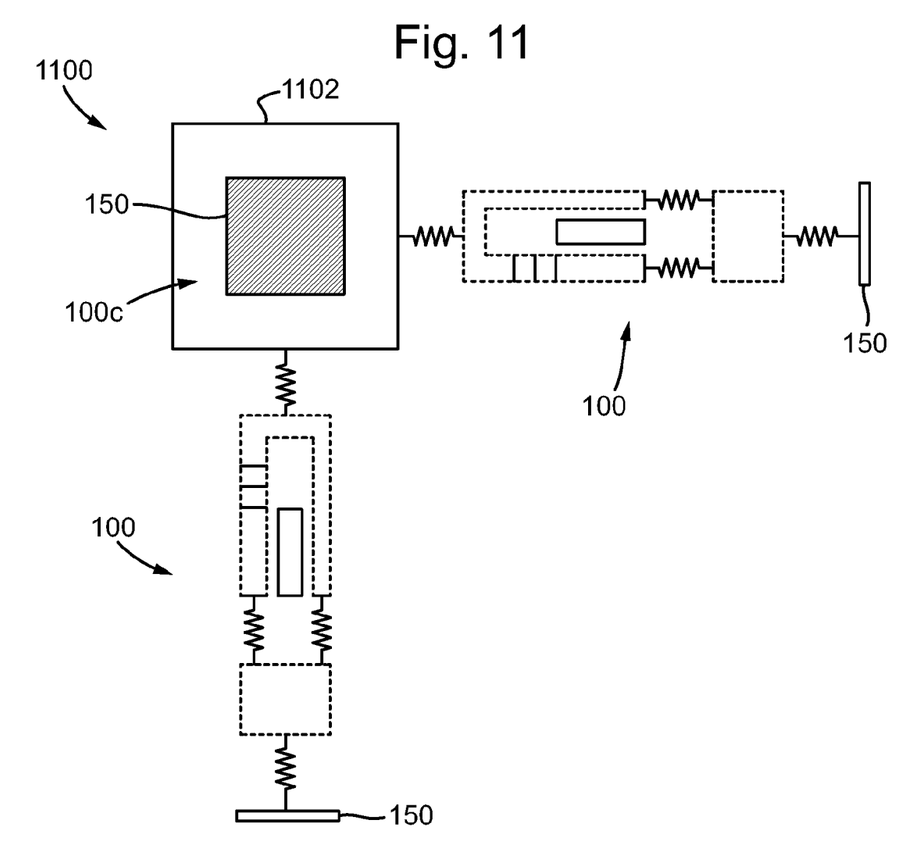
FIG. 11 shows an active vibration control apparatus comprising a plurality of active vibration control systems and a proof-mass, each shown in an axisymmetric cross-sectional view.

Such an arrangement is illustrated in FIG. 11. Referring to FIG. 11, an active vibration control apparatus 1100 comprises a plurality of active vibration control systems 100*a*, 100*b*, 100*c* resiliently connected to three faces of a cuboidal proof-mass 1102. It will be appreciated by the skilled person that the active vibration control systems 100*a*, 100*b*, 100*c* could be replaced by active vibration control systems 300, 400, 500 and may comprise any or all features of those embodiments, as necessary or as desired.

Figure 12:
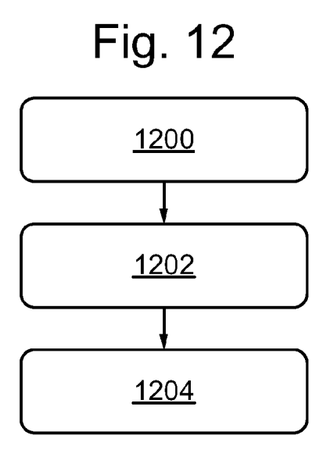
FIG. 12 shows general methodology principles of an active vibration control system.

Referring to FIG. 12, general methodology principles of an active vibration control system are shown. The method is of actively controlling vibrations of a base structure. Step 1200 comprises providing an active vibration control system comprising: an electromagnetic actuator and a control element, the electromagnetic actuator and control element being relatively moveable such that the active vibration control system has at least two modes of vibration, and wherein movement of the electromagnetic actuator causes movement of at least a part of the control element. Step 1202 comprises attaching the active vibration control system to the base structure. Step 1204 comprises operating the electromagnetic actuator to apply a force on the base structure.

Figure 13:
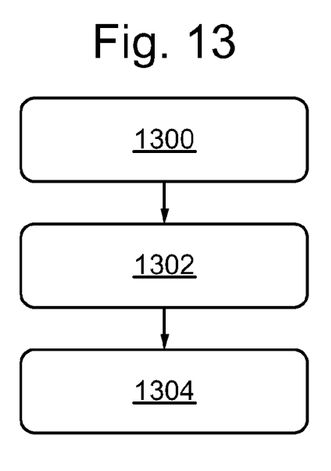
FIG. 13 shows general methodology principles of an active vibration control system.

Referring to FIG. 13, general methodology principles of an active vibration control system are shown. The method is of actively controlling vibrations of a base structure. Step 1300 comprises providing an active vibration control system comprising a driving mechanism and a control mechanism comprising an electromagnetic actuator, wherein the driving mechanism and the control mechanism are relatively moveable such that the active vibration control system has at least two modes of vibration, and wherein movement of the driving mechanism causes movement of at least a part of the control mechanism. Step 1302 comprises attaching the active vibration control system to the base structure. Step 1304 comprises operating the driving mechanism to apply a force on the base structure.

Figure 14:
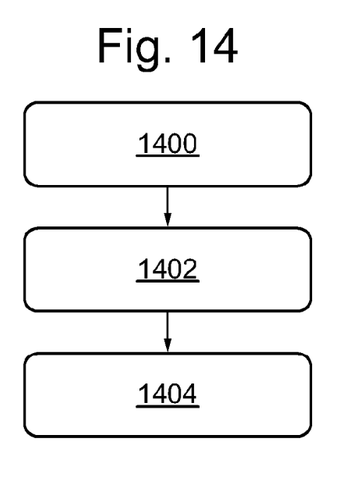
FIG. 14 shows general methodology principles of an active vibration control system.

Referring to FIG. 14, general methodology principles of an active vibration control system are shown. The method is of actively controlling vibrations of a base structure. Step 1400 comprises providing an active vibration control system comprising an electromagnetic actuator, a magnetic element, and a solenoid, wherein the electromagnetic actuator is operable to cause movement of the magnetic element through the solenoid and the solenoid is operable to apply a force on the magnetic element. Step 1402 comprises attaching the active vibration control system to the base structure. Step 1404 comprises operating the electromagnetic actuator to apply a force on the base structure.

Although a few preferred embodiments of the present invention have been shown and described, it will be appreciated by those skilled in the art that various changes and modifications might be made without departing from the scope of the invention, as defined in the appended claims.

The preceding description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the preceding description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. The terms "front", "rear", "side", "upper", "lower", "over", "under", "inner", "outer" and like terms are used to refer to the apparatus and its components in the orientation in which it is illustrated, which is the orientation in which it is intended to be used but should not be taken as otherwise limiting. Like reference numerals are used to denote like features throughout the figures, which are not to scale.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An active vibration control system comprising: an electromagnetic actuator and a control element, the electromagnetic actuator being operable to apply a force on a base structure to which the active vibration control system is attachable such that vibrations of the base structure are actively controllable by the application of said force, wherein the electromagnetic actuator and the control element are relatively moveable such that the active vibration control system has at least two modes of vibration, wherein movement of the electromagnetic actuator causes movement of at least a part of the control element, wherein the electromagnetic actuator comprises a movable member, and wherein, in a first mode of vibration, the moveable member and the control element oscillate in-phase with one another, and, in a second mode of vibration, the moveable member and the control element oscillate out-of-phase with one another.

2. The active vibration control system of claim 1, wherein the electromagnetic actuator comprises a coil and the moveable member comprising a permanent magnet, the coil being associated with the permanent magnet such that current flowing through the coil in the presence of the magnetic field causes movement of the moveable member.

3. The active vibration control system of claim 1, comprising a control system to control flow of current to the electromagnetic actuator.

4. The active vibration control system of claim 1, wherein the electromagnetic actuator and control element are resiliently attached so that movement of the electromagnetic actuator causes movement of the at least a part of the control element.

5. The active vibration control system of claim 4, wherein the electromagnetic actuator and the control element are resiliently attached via a plurality of compliant material layers.

6. The active vibration control system of claim 1, wherein the control element is resiliently attached to the base structure.

7. The active vibration control system of claim 1, wherein the electromagnetic actuator is a first electromagnetic actuator, and the control element is an active control mechanism comprising a second electromagnetic actuator, the second electromagnetic actuator being operable to cause displacement of the at least a part of the control element relative to the first electromagnetic actuator, thereby to control movement of the first electromagnetic actuator.

8. The active vibration control system of claim 1, wherein the control element comprises a proof-mass.

9. The active vibration control system of claim 1, comprising a plurality of electromagnetic actuators and a common control element.

10. The active vibration control system of claim 1, wherein the electromagnetic actuator is arranged to move parallel to an axis, and the control element is arranged to move parallel to the axis.

11. The active vibration control system of claim 9, wherein each electromagnetic actuator is arranged to move parallel to a different axis, and the control element is arranged to move parallel to each axis.

12. An active vibration control apparatus comprising a proof-mass and a plurality of active vibration control systems as claimed in claim 1.

13. A vehicle comprising the active vibration control system of claim 1.

14. The vehicle of claim 13, wherein the base structure forms part of the vehicle.

15. A method of actively controlling vibrations of a base structure, the method comprising:
providing an active vibration control system that includes an electromagnetic actuator and a control element, the electromagnetic actuator and the control element being relatively moveable such that the active vibration control system has at least two modes of vibration, wherein movement of the electromagnetic actuator causes movement of at least a part of the control element, wherein the electromagnetic actuator comprises a movable member, and wherein, in a first mode of vibration, the moveable member and the control element oscillate in-phase with one another, and, in a second mode of vibration, the moveable member and the control element oscillate out-of-phase with one another;

attaching the active vibration control system to the base structure; and operating the electromagnetic actuator to apply a force on the base structure.

16. The method of claim 15, wherein the control element is resiliently attachable to the base structure.

17. The vehicle of claim 13, wherein the vehicle is one of a ground-based vehicle, an aquatic vehicle, or an airborne vehicle.

18. A vehicle comprising the active vibration control apparatus of claim 12.

19. The active vibration control system of claim 7, wherein the control element comprises a proof-mass.

20. An active vibration control apparatus comprising a proof-mass and a plurality of active vibration control systems as claimed in claim 7.

* * * * *